United States Patent [19]  [11] 3,976,761
Gomes et al.  [45] Aug. 24, 1976

[54] PREPARATION OF TIO$_2$ AND ARTIFICIAL RUTILE FROM SODIUM TITANATE

[75] Inventors: John M. Gomes; Daniel A. O'Keefe, both of Reno, Nev.

[73] Assignee: The United States of America as represented by the Secretary of the Interior, Washington, D.C.

[22] Filed: Aug. 14, 1974

[21] Appl. No.: 497,446

[52] U.S. Cl. ............................... 423/610; 423/499; 423/551; 423/552
[51] Int. Cl.$^2$ .................... C01G 23/08; C01D 3/04; C01D 5/00
[58] Field of Search ............ 423/610, 551, 552, 499

[56] References Cited
UNITED STATES PATENTS

| | | | |
|---|---|---|---|
| 2,801,900 | 8/1957 | Benning et al. | 423/551 X |
| 3,424,555 | 1/1969 | von Bichowsky | 423/610 |

FOREIGN PATENTS OR APPLICATIONS

| | | | |
|---|---|---|---|
| 544,500 | 8/1957 | Canada | 423/610 |
| 696,501 | 9/1953 | United Kingdom | 423/610 |

OTHER PUBLICATIONS

Jelks Barksdale's Book "Titanium", Second Edition, 1966, p. 324, The Ronald Press Co., New York.
J. W. Mellor's "A Comprehensive Treatise on Inorganic and Theo. Chemistry", vol. 7, pp. 51, 52, Longmans, Green & Co., N.Y.

Primary Examiner—Edward Stern
Attorney, Agent, or Firm—William S. Brown; Donald R. Fraser

[57] ABSTRACT

Pigment TiO$_2$ is prepared from sodium titanate by mixing with sulfuric acid, calcining at from 600° to above about 900°C, thereafter quenching in water, dissolving out the soluble sodium sulfate and recovering TiO$_2$. By operating at 900°C and above, artificial rutile is obtained. Instead of sulfuric acid, other mineral acids, their anhydrides, ammonium and alkali metal acid salts of said acids and borax may be employed.

4 Claims, No Drawings

PREPARATION OF TiO₂ AND ARTIFICIAL RUTILE FROM SODIUM TITANATE

CROSS REFERENCE TO RELATED APPLICATION

Reference is made to U.S. patent application Ser. No. 260,262 to John M. Gomes and Kenji Uchido entitled "Process for Smelting Ilmenite to Produce a Pig Iron and Titania Slag", filed June 6, 1972 now U.S. Pat. No. 3,829,309 and having the same assignee as the present application.

BACKGROUND OF THE INVENTION

1. Field of the Invention

This invention relates to the preparation of TiO₂ from sodium titanate by reacting with sulfuric acid and calcining.

2. Description of the Prior Art

Two processes are in general use for making TiO₂. The older sulfate process involves dissolving a titanium source, e.g. ilmenite, in sulfuric acid and then hydrolyzing the titanium sulfate to TiO₂, which is then calcined. The other process is the chloride process wherein rutile is chlorinated to form TiCl₄ which is then oxidized to form TiO₂. Both processes are described in greater detail in Kirk-Othmer "Encyclopedia of Chemical Technology", 2nd Edition, Vol. 20, pp. 392–410. Attention is also directed to a review of processes for making artificial rutile by Henn et al, entitled "A Review of Proposed Processes for Making Rutile Substitutes", Bureau of Mines Information Circular 8450, 1970, 27pp.

In the prior related application Ser. No. 260,262 a process is described for producing sodium titanate from ilmenite by smelting the latter with a carbonaceous reducing agent and an alkali metal borate flux. The sodium titanate is then subjected to the conventional sulfate process for recovering TiO₂.

SUMMARY OF THE INVENTION

The present invention recovers TiO₂ from sodium titanate, which may be produced by any of the processes of the prior art, but which is conveniently obtained by the process of said application Ser. No. 260,262. The term "sodium titanate" as employed herein refers not only to Na₂TiO₃ but to the other sodium titanates as well, such as Na₂Ti₂O₅, Na₂Ti₃O₇ and Na₂Ti₂O₄, Na₈Ti₅O₁₄, Na₄Ti₃O₈. These in general correspond to (Na₂O)$_a$·(TiO₂)$_b$, wherein $a$ and $b$ are small whole numbers.

The sodium titanate is admixed with a greater than stoichiometric amount of dilute sulfuric acid to form a thick slurry which may be pelletized or nodulized. The mixture is then heated in the range of from about 600°C to above about 900°C over a two-hour period or longer and reacts according to the following exemplary equation:

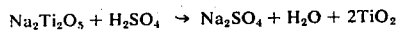
$$Na_2Ti_2O_5 + H_2SO_4 \rightarrow Na_2SO_4 + H_2O + 2TiO_2$$

Thereafter the calcinate is quenched in water and stirred to dissolve out the sodium sulfate. The TiO₂ produced is then filtered, washed and dried.

OBJECTS OF THE INVENTION

It is an object of the invention to produce TiO₂ by forming a mixture of sodium titanate with sulfuric acid and calcining the mixture at a temperature range of from 600°C to above about 900°C.

It is a further object of the invention to nodulize sodium titanate with a stoichiometric excess of sulfuric acid and calcine the nodules to at least about 900°C.

It is a further object to treat the quenched calcinates with water and dissolve out the sodium sulfate produced, leaving behind a residue containing TiO₂.

It is a further object of the invention to mix sodium titanate with a reagent selected from the group consisting of a mineral acid or anhydride, or an ammonium salt or alkali metal acid salt of said acid or borax and calcining at a temperature range of from 600°C to above about 900°C to form TiO₂.

It is a further object of the invention to produce synthetic rutile by calcining the mixture at about 900°C and above.

It is a further object of the invention to calcine at a temperature of at least about 900°C to form a synthetic rutile.

It is a further object of the invention to quench the calcinate in water and dissolve out the water-soluble sodium salts leaving a TiO₂ residue.

It is a further object to employ sulfuric acid in stoichiometric excess as the acid component of the reaction mass.

Yet a further object is to employ a dilute acid to lixiviate the calcinate.

Further objects will become apparent from the following specification and claims.

BRIEF DESCRIPTION OF PREFERRED EMBODIMENTS

Titania is the world's major paint pigment. It is non-toxic and has excellent weather resistant properties, as well as outstanding opacifying and covering power. Titania pigment is prepared from rutile mineral concentrates according to one method by a chlorination process. Titanium metal, which is important in commercial and military aircraft technology, is also prepared by chlorinating rutile concentrates to yield titanium chloride (TiCl₄), which is metallothermically reduced to titanium metal. At present, all rutile consumed in the U.S. for these purposes must be imported. Preparing a rutile substitute from domestic ilmenite would have obvious economic and strategic advantages.

The sodium titanate product produced by application Ser. No. 260,262 contains about 6–8% by weight of Na₂O which must be removed before a rutile substitute could be produced from it.

We have found that such removal and formation of rutile can be accomplished in one embodiment by mixing the sodium titanate with a stoichiometric excess of dilute sulfuric acid and heating for about 2 hours at a temperature of at least about 900°C and subsequently quenching in water, and agitating to remove soluble sodium sulfate. The dilute sulfuric acid may vary in strength, but acid of 20 to 30 w/o (300 to 400 g/l H₂SO₄) is preferred as the quantity required to yield a slurry of the right consistency for nodulizing or pelletizing. About 120 to 150 percent of the acid stoichiometric requirement is employed. The following example illustrates the procedure:

EXAMPLE

A. Raw Materials

| | |
|---|---|
| Sodium titanate composition | 78.5 w/o TiO$_2$ |
| | 8.1 w/o Na$_2$O |
| | .9 w/o B$_2$O$_3$ |
| | .2 w/o Fe |
| Sulfuric Acid Solution | 30 w/o H$_2$SO$_4$ |
| | (366 g/l H$_2$SO$_4$) |

B. Procedure

One kg of titanate was mixed with 500 ml of the 30 w/o H$_2$SO$_4$ in a glass bowl with a 2-bladed mixer. The slurry was transferred to a fireclay crucible. The quantity of H$_2$SO$_4$ used was 140 percent of stoichiometric. The crucible was placed in a cool pot furnace and the pot furnace was heated to about 900°C over a period of two hours. After an additional hour at about 900°C, the hot calcinate was quenched in water. Thereafter, pulp was agitated for two hours to dissolve the soluble sodium sulfate from the insoluble TiO$_2$. The residue was then filtered, washed and dried.

The artificial rutile produced contained 95.5 w/o TiO$_2$ and 0.13 w/o Na$_2$O. The spectrographic analysis is shown in the following table:

Spectrographic Analysis, wt. %

| Al | B | Ca | Cr | Cu | Fe | Mg | Mn | Si | V | Zr |
|---|---|---|---|---|---|---|---|---|---|---|
| 0.10 | 0.05 | 0.02 | 0.04 | 0.01 | 0.4 | 0.1 | 0.4 | 0.30 | 0.04 | 0.10 |

The product is 94% in the minus 325 mesh fraction and was identified by X-ray diffraction as mainly rutile. Over 99% of the TiO$_2$ in the titanate is recovered in the artificial rutile product.

Waste sulfuric acid from the hydrolysis state of a TiO$_2$ sulfate-process plant may be used to advantage in the present invention. Such acid contains about 350 to 400 g/l H$_2$SO$_4$, 10–15 g/l TiO$_2$ and 40 g/l Na$_2$O. It will be noted that this is approximately the same concentration of acid as in the Example. The presence of TiO$_2$ in the acid serves to increase the overall production of TiO$_2$.

The acid and titanate are mixed on a nodulizing type disc, or blended and extruded as pellets, or simply made into a thick slurry. Calcining takes place in a rotary kiln or hearth furnace. Preferably the charge should be allowed to come up to the required temperature rather slowly. Placing the mixture in a hot furnace did not yield as good results as slower heating. By way of illustration, the mixture should be allowed to reach the desired temperature, say 900°C, in one to two hours, rather than be fed into a 900°C furnace.

The loosely sintered calcinate is quenched in an agitating tank with an excess of water, causing it to break up. Sodium sulfate is leached out by the hot water, leaving behind the TiO$_2$ which is filtered and washed on a drum-type or other suitable filter, and dried. Essentially, all the TiO$_2$ values present in the material fed to the calcining step are recovered as TiO$_2$ in this process.

While sulfuric acid has been disclosed as the reagent which reacts with the soda in the sodium titanate to form a water-soluble compound, it is obvious that other compounds may be employed to this end. Experiments have shown that 92–96% TiO$_2$ product is obtained by heating sodium titanate with ammonium sulfate (fertilizer grade), ammonium phosphate (fertilizer grade) or boric oxide (B$_2$O$_3$) instead of sulfuric acid. These reagents were added to the titanate in stoichiometric excess, thoroughly mixed therewith, and heated form room temperature to 600°–800°C. The calcinate was then quenched and leached in water to dissolve out the sodium sulfate, sodium phosphate and sodium borate, respectively. TiO$_2$ products containing as low as 0.1% by weight of Na$_2$O were obtained.

Other compounds which have been employed as substitutes for H$_2$SO$_4$ are HCl, Na$_2$B$_4$O$_7$ and (NH$_4$)$_2$CO$_3$. It is believed apparent that any reagent which reacts with the sodium titanate to form a water soluble sodium compound but does not adversely affect the titanium oxide, as by forming other compounds difficult to separate therefrom, may be employed in place of sulfuric acid. In general, the mineral acids, acid anhydrides, their ammonium and acidic alkali metal salts may be employed. However, it will be generally found that sulfuric acid is the most economical reagent to employ.

The operating temperature in the kiln or furnace may vary from 600° to above about 900°C but a true rutile structure can be obtained only at temperatures near 900°C, the rutile transition temperature, and above. Dilute acid, preferably a mineral acid, may be employed in the leaching step instead of water. About 5% HCl or H$_2$SO$_4$ serves to dissolve out alumina or iron impurities resulting in a purer TiO$_2$ product.

The invention described above sets forth a novel and unobvious method for preparing synthetic rutile and pigment grade TiO$_2$ from sodium titanate by admixing with acid, calcining, quenching and lixiviating.

We claim:

1. A method for producing TiO$_2$ from sodium titanate which consists essentially of:
   a. admixing with said sodium titanate a greater than stoichiometric amount of a dilute aqueous acid selected from the group consisting of sulfuric acid and hydrochloric acid to form a thick slurry;
   b. pelletizing or nodulizing said slurry;
   c. heating the pellets or nodules formed in step (b) in the range of from about 600°C to above about 900°C for at least two hours to form a loosely sintered calcinate;
   d. quenching the calcinate in water causing it to break up and stirring the mixture to dissolve out the sodium salt formed during step of calcination;
   e. filtering to recover the TiO$_2$ produced in calcination step (c);
   f. washing and drying the TiO$_2$ recovered in step (e).

2. The method of claim 1 wherein the acid admixed with sodium titanate is essentially sulfuric acid.

3. The method of claim 2 wherein the acid comprises waste sulfuric acid from the sulfate process for making TiO$_2$.

4. The method of claim 1 wherein the temperature of calcination is about 900°C, whereby artificial rutile is produced.

\* \* \* \* \*